(12) United States Patent
Durnell

(10) Patent No.: US 7,391,887 B2
(45) Date of Patent: Jun. 24, 2008

(54) EYE TRACKING SYSTEMS

(75) Inventor: Laurence Durnell, Southwood (GB)

(73) Assignee: Qinetiq Limited, Farnborough, Hants (GB)

( * ) Notice: Subject to any disclaimer, the term of this patent is extended or adjusted under 35 U.S.C. 154(b) by 711 days.

(21) Appl. No.: 10/486,586

(22) PCT Filed: Aug. 8, 2002

(86) PCT No.: PCT/GB02/03658

§ 371 (c)(1),
(2), (4) Date: Feb. 11, 2004

(87) PCT Pub. No.: WO03/017203

PCT Pub. Date: Feb. 27, 2003

(65) Prior Publication Data

US 2004/0196433 A1  Oct. 7, 2004

(30) Foreign Application Priority Data

Aug. 15, 2001 (GB) ................................. 0119859.7

(51) Int. Cl.
*G06K 9/00* (2006.01)
*H04Q 9/00* (2006.01)
*H04N 7/18* (2006.01)
*H04N 5/225* (2006.01)
*A61B 3/00* (2006.01)
*A61B 18/18* (2006.01)
*G01N 21/00* (2006.01)

(52) U.S. Cl. ........................ 382/117; 382/103; 340/5.8; 348/77; 348/169; 351/200; 356/29; 356/511; 606/4

(58) Field of Classification Search ................. 382/117, 382/103, 115, 118; 340/5.8–5.83; 348/77–78, 348/169–172; 351/200–209; 356/29, 511–512; 606/4–6
See application file for complete search history.

(56) References Cited

U.S. PATENT DOCUMENTS 3,689,135 A * 9/1972 Young et al. ................ 351/246

(Continued)

FOREIGN PATENT DOCUMENTS

DE 196 01 026 7/1997

(Continued)

OTHER PUBLICATIONS

Automated thresholding for real-time image processing in video-based eye-gaze detection, K. Tokunou, Y. Ebisawa; Engineering in Medicine and Biology Society, 1998. Proceedings of the 20th Annual International Conference of the IEEE, vol. 2, Oct. 29-Nov. 1, 1998, pp. 748-751.*

(Continued)

*Primary Examiner*—Bhavesh M. Mehta
*Assistant Examiner*—Manav Seth
(74) *Attorney, Agent, or Firm*—Nixon & Vanderhye P.C.

(57) ABSTRACT

An eye tracking system includes an eye camera and a scene camera for supplying video data to interlace electronics indicative of an image of the user's eye and an image of the scene observed by the user. A frame grabber is provided for digitizing the video data and for separating the eye and scene data into two processing channels, and a spot location module determines the location of a reference spot formed on the user's eye. The module includes an adaptive threshold and spot identification sub-modules for indicating parts of the eye camera image which have higher brightness, and for selecting a valid reference spot. A pupil location module determines the user's line of gaze, and a display for indicating the user's point of regard from the user's line of gaze determined by the pupil and spot location modules.

17 Claims, 7 Drawing Sheets

U.S. PATENT DOCUMENTS

| | | | | |
|---|---|---|---|---|
| 3,804,496 | A | * | 4/1974 | Crane et al. ............ 356/139.03 |
| 4,102,564 | A | * | 7/1978 | Michael ...................... 248/118 |
| 4,641,349 | A | * | 2/1987 | Flom et al. .................. 382/117 |
| 4,702,575 | A | * | 10/1987 | Breglia ........................ 351/210 |
| 4,768,088 | A | * | 8/1988 | Ando ............................ 348/77 |
| 4,789,235 | A | * | 12/1988 | Borah et al. ................. 351/246 |
| 4,836,670 | A | | 6/1989 | Hutchinson |
| 4,852,988 | A | * | 8/1989 | Velez et al. .................. 351/210 |
| 4,950,069 | A | | 8/1990 | Hutchinson |
| 4,973,149 | A | | 11/1990 | Hutchinson |
| 5,016,282 | A | * | 5/1991 | Tomono et al. ............. 382/173 |
| 5,220,361 | A | * | 6/1993 | Lehmer et al. .............. 351/226 |
| 5,231,674 | A | * | 7/1993 | Cleveland et al. ........... 382/117 |
| 5,471,542 | A | | 11/1995 | Ragland |
| 5,481,622 | A | * | 1/1996 | Gerhardt et al. ............. 382/103 |
| 5,491,757 | A | * | 2/1996 | Lehmer et al. .............. 382/128 |
| 5,912,721 | A | * | 6/1999 | Yamaguchi et al. ......... 351/210 |
| 6,152,563 | A | * | 11/2000 | Hutchinson et al. ......... 351/209 |
| 6,307,589 | B1 | * | 10/2001 | Maquire, Jr. ........... 348/333.03 |
| 6,714,665 | B1 | * | 3/2004 | Hanna et al. ................. 382/117 |
| 2006/0158639 | A1 | * | 7/2006 | Campin et al. ................ 356/29 |

FOREIGN PATENT DOCUMENTS

| | | |
|---|---|---|
| EP | 1 209 553 | 5/2002 |
| JP | 05064061 | 3/1993 |
| JP | 05-064061 | * 12/1993 |
| JP | 11-338615 | 12/1999 |
| WO | WO 01/33323 | 5/2001 |
| WO | WO 2004/066097 | 8/2004 |

OTHER PUBLICATIONS

Maranski; "A Method of Tracking Eye Motion for Human-Computer Interface"; Master Thesis, New Jersey, Inst. Of Technology, Online, May 2000, pp. 1-54, XP002226045.

Zabaronick; "Eye Tracking Using Fiber Optics and Computer Vision Techniques"; Master Thesis, Virginia Polytechnic Inst., Online, Apr. 4, 1997, pp. 1-52, XP002226046.

Ebisawa; "Improved Video-Based Eye-Gaze Detection Method"; Instrumentation and Measurement Technology Conference, 1994, IMTC/94. Conference Proceedings. 10th Anniversary. Advanced Technologies In I & M., 1994 IEEE, Hamamatsu, Japan, May 10-12, 1994, New York, NY, USA, IEEE, pp. 963-966, XP010121841.

Tokunou et al; "Automated Thresholding for Real-Time Image Processing in Video-Based Eye-Gaze Detection"; Engineering In Medicine and Biology Society, 1998, Proceedings of the 20th Annual International Conference of the IEEE Hong Kong, China Oct. 29-Nov. 1, 1998, Piscataway, NJ, USA, IEEE, US, Oct. 29, 1998, pp. 748-751, XP010320549.

* cited by examiner

EYE TRACKING SYSTEMS

This application is the U.S. national phase of international application PCT/GB02/03658, filed in English on 08 Aug. 2002, which designated the US. PCT1GB02103658 claims priority to GB Application No. 0119859.7 filed 15 Aug. 2001. The entire contents of these applications are incorporated herein by reference.

This invention relates to eye tracking systems for monitoring a user's point of regard in a scene.

It is known to monitor the position of a user's eye within its socket in order to determine the user's line of gaze, for example to enable the user to control a device, such as a weapon, by eye movements or to determine whether the user is watching a predetermined location, such as a television screen, or simply to determine the state of wakefulness of the user.

Furthermore a number of different methods have been proposed for monitoring the position of the user's eye, including the so-called corneal reflection (CR) method in which a point light source is used to produce a bright image on the anterior surface of the cornea, and a tracking system monitors the position of the image. However such a method has been found to be very sensitive to errors induced by sensor movement.

As an alternative the so-called differential CR/pupil tracking method has been developed in which the relative positions of the pupil and a corneal reflection are monitored by a suitable camera, a wavelength-sensitive beam splitter being used to ensure that the user's view is not obstructed by the light source and camera. Such a method is less sensitive to sensor movements. Generally the eye is illuminated by a near infrared source (or multiple sources) and a solid state video camera captures an image of the eye. In so-called bright pupil imaging the light source produces a light beam which is coaxial with the camera axis, and light reflected back from the retina making the pupil appear to be a bright circle, the apparent brightness increasing roughly with the fourth power of pupil diameter. In so-called dark pupil imaging the light source produces a light beam which is off axis relative to the camera axis, and a dark pupil image is produced. Real time image analysis is used to identify the pupil and corneal reflections and to find their centres.

Most existing eye tracking systems utilise a threshold applied directly to the video output signal from the camera. This creates a binary image from which the required features are extracted. This technique is computationally fast, but has significant limitations if the image quality is poor or the pupil size varies for instance in response to the ambient luminance. Also, in order to achieve good accuracy, such systems tend to use complex and time-consuming calibration procedures. This renders such systems relatively sensitive and difficult to use.

It is an object of the invention to provide a versatile and fast-acting eye tracking system for monitoring the movement of a user's eye in order to determine the user's point of regard in a scene.

According to one aspect of the present invention there is provided an eye tracking system for monitoring the movement of a user's eye, the system comprising:

(a) video data input means for receiving video data produced by eye imaging means monitoring the user's eye;

(b) spot location means for determining from the video data the location of a reference spot formed on the user's eye by illumination of the user's eye by a point source of light, the spot location means including adaptive threshold means for providing an indication of parts of the image produced by the eye imaging means which have a brightness greater than a threshold value, and spot identification means for selecting a valid reference spot by comparing said parts of the image with predetermined validity criteria;

(c) pupil location means for determining from the video data the location of the centre of the pupil of the user's eye relative to the reference spot in order to determine the user's line of gaze, the pupil location means including selection means for selecting a pupil tracking window comprising a portion of the image produced by the eye imaging means containing the pupil relative to the valid reference spot location, edge determination means for determining an edge of the pupil by selection of those parts of the gradient of said image portion in the pupil tracking window which have a gradient greater than a threshold value; and (d) display means for indicating the user's point of regard from the user's line of gaze determined by the pupil and spot location means.

Such an eye tracking system can be adapted to any video-based eye tracker. It is suitable for dark or bright pupil eye imaging, and can be used with eye tracker optics having one or more eye illuminators, such as infrared light-emitting diodes (IR LEDs). It can accommodate interleaved eye/scene images, interleaved left-eye/right-eye images and non-interleaved images, and is effective at finding image features under adverse lighting conditions. Furthermore the preferred implementation is robust and easy to use.

According to another aspect of the present invention there is provided an eye tracking system for monitoring the movement of a user's eye, the system comprising:

(a) video data input means for receiving video data produced by eye imaging means monitoring the user's eye and scene imaging means monitoring a scene being observed by the user's eye;

(b) spot location means for determining from the video data the location of at least one reference spot formed on the user's eye by illumination of the user's eye by a point source of light;

(c) pupil location means for determining the location of the pupil of the user's eye relative to the reference spot in order to determine the user's line of gaze; and (d) scene overlay means for indicating the user's point of regard in the scene from the user's line of gaze determined by the pupil and spot location means relative to an image of the scene obtained from the video data.

In order that the invention may be more fully understood, reference will now be made, by way of example, to the accompanying drawings, in which.

Figure 1:
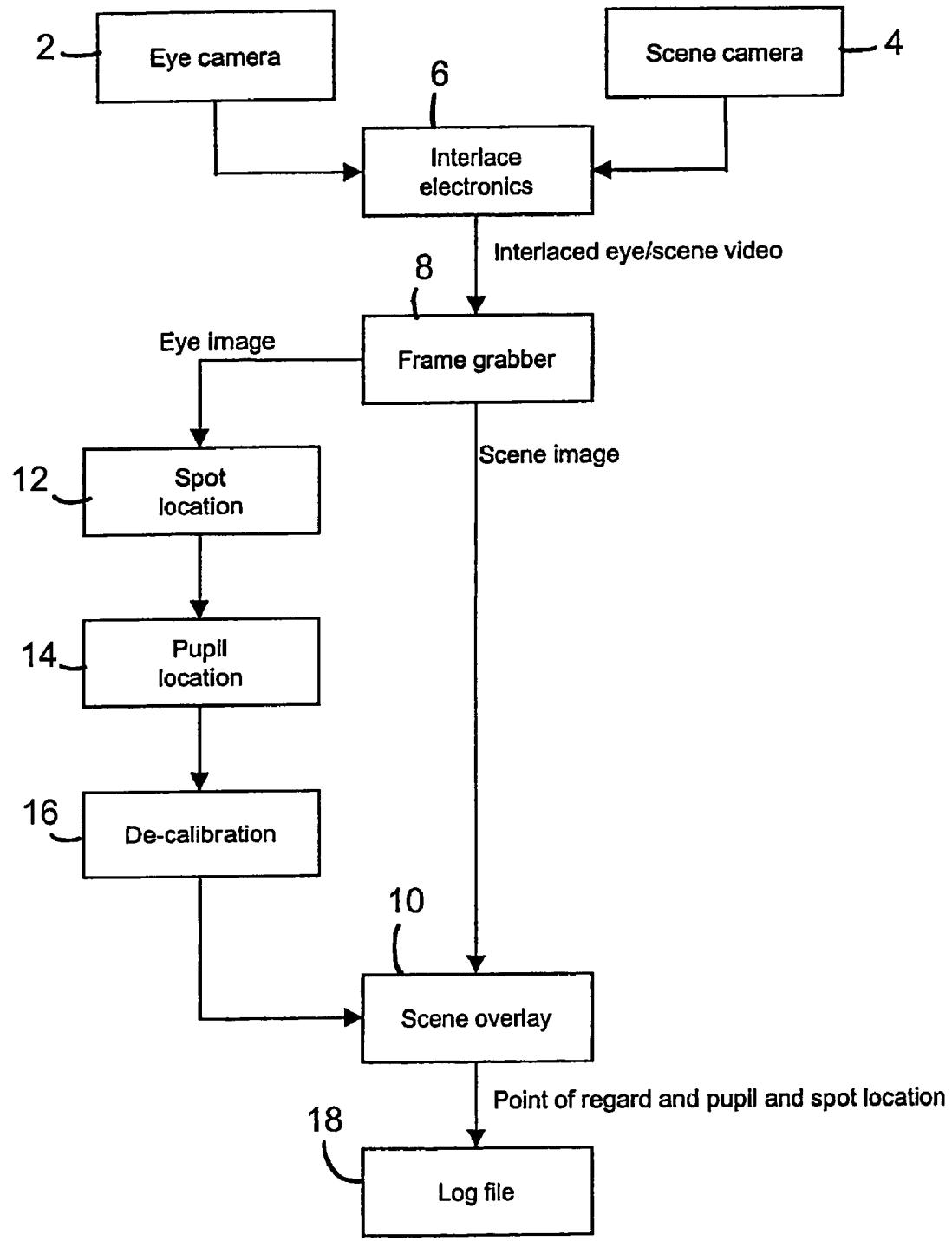
FIG. 1 is a block diagram of an eye tracking system in accordance with the invention.

FIG. 1 shows a typical layout for a full eye tracking system in accordance with the invention, the system incorporating two cameras, namely an eye camera 2 for capturing an image of the user's eye, and a scene camera 4 for capturing an image of the scene observed by the user's eye. The output signals from these cameras 2 and 4 are synchronised and supplied to an interleaving electronics module 6 which selects alternate fields from these output signals to form a standard video signal which is then digitised frame-by-frame by a frame grabber module 8 and separated into two processing channels, that is one for eye images and one for scene images. The output signals from the frame grabber module 8 representative of the scene images are passed directly to a scene overlay module 10, whilst the output signals representative of the eye images are subjected to a series of image processing operations as follows.

In a spot location module 12 the location within the eye image of a reference spot formed on the user's eye by illumination of the user's eye by a point source of light is determined, and in a pupil location module 14 the location of the user's eye pupil in the same image is determined. After decalibration of the signal in a decalibration module 16, the resulting image signal is supplied to the scene overlay module 10, in order to calculate the user's point of regard in the scene image. Output signals indicative of the point of regard and pupil and spot location are then supplied by the scene overlay module 10 to a log file module 18 which maintains a log file of eye movements.

Figure 8:
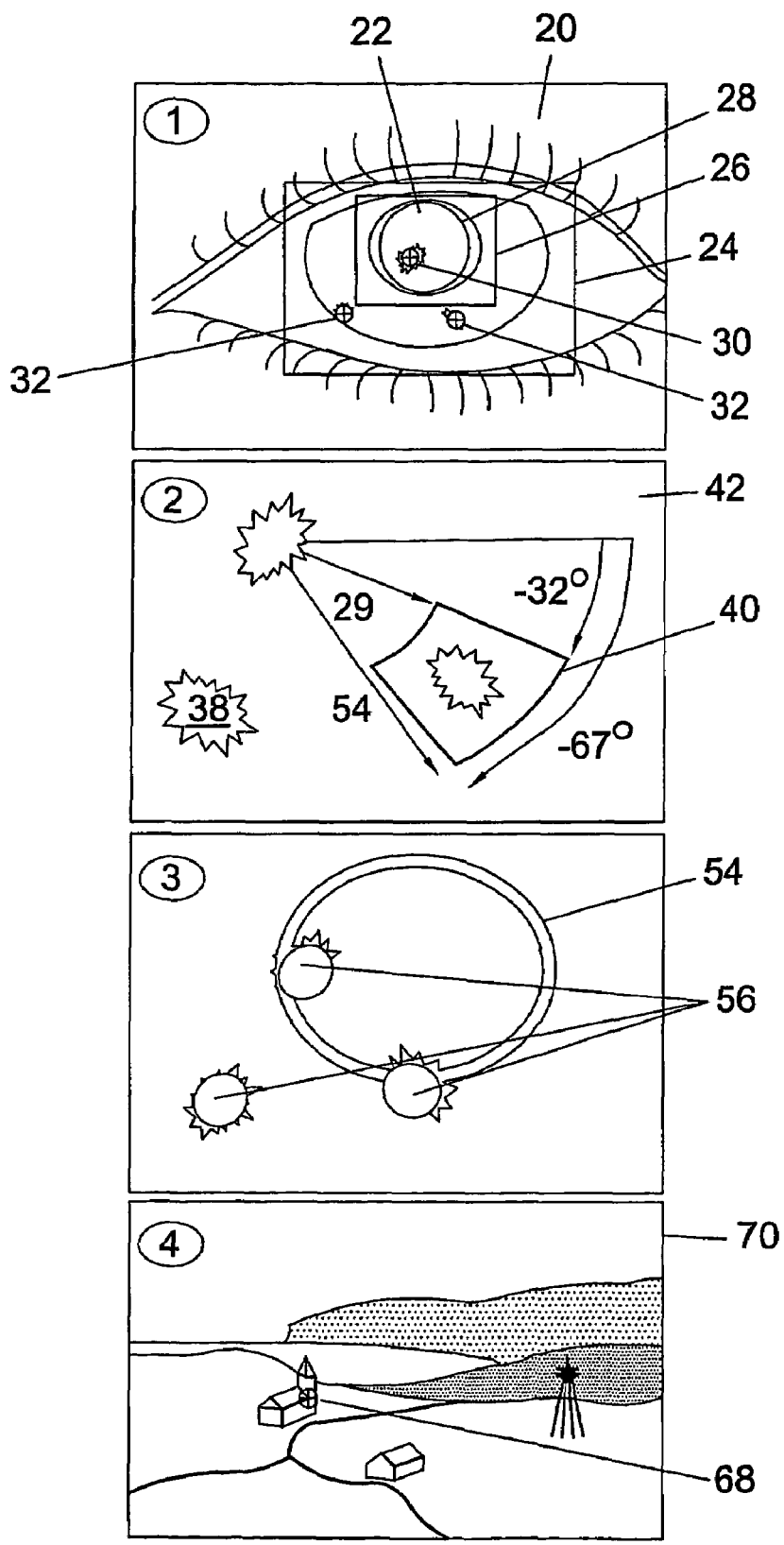
FIG. 8 is a series of explanatory diagrams.

FIG. 8 shows a series of diagrams which are helpful in appreciating the operation of the eye tracking system in accordance with the invention. Diagram 1 of FIG. 8 shows a display 20 of the raw eye showing in particular an image 22 of the area around the pupil of the eye. There is shown overlaid on this image a rectangular spot search area 24, a pupil tracking area 26, a pupil 28, a reference spot 30 formed by illumination by the point light source, and daughter spots 32 derived from reflections of additional point light sources. It is important to appreciate that there is only one reference spot, the daughter spots being caused by other light sources. In this example the reference spot is distinguished from the daughter spots because it occurs earlier in the video signal.

Figure 2:
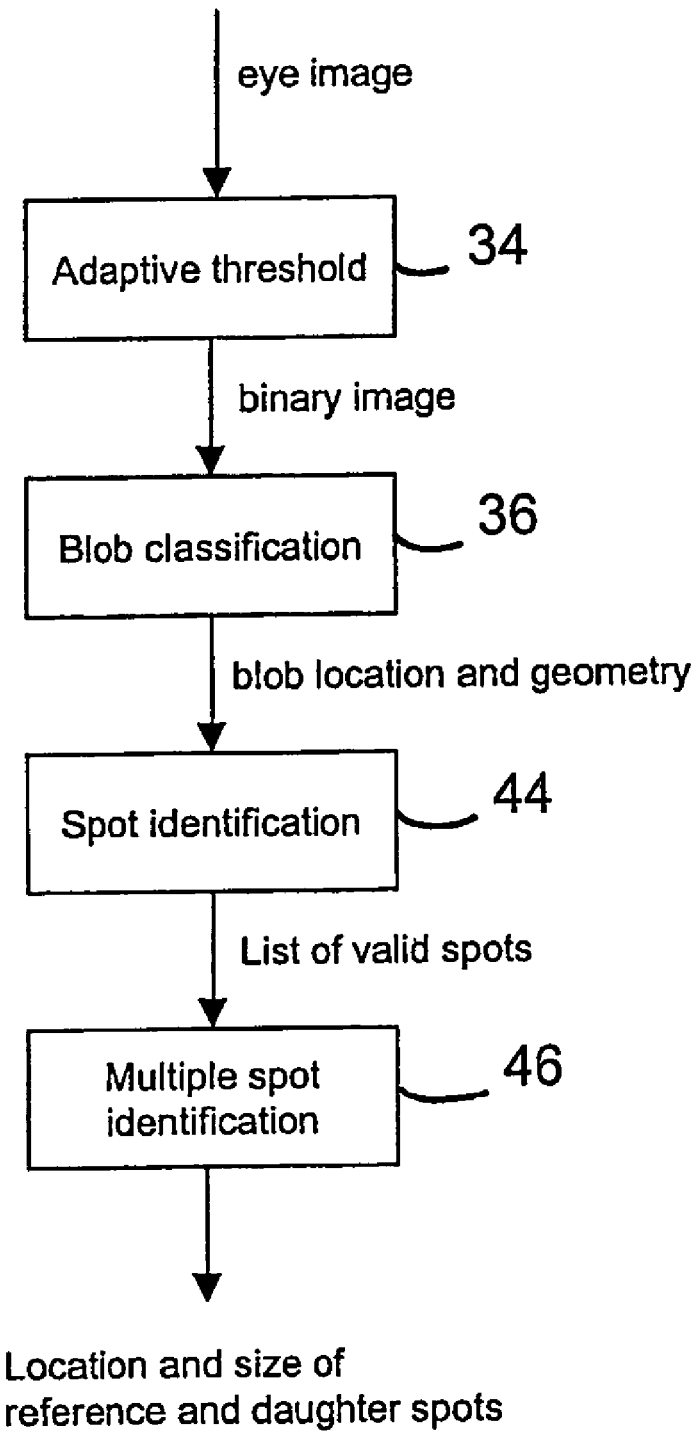
FIGS. 2 and 3 are block diagrams of preferred spot and pupil location arrangements for use in the eye tracking system of FIG. 1.

FIG. 2 is a block diagram showing the processing of the eye image signals within the spot location module. In this module the signals are supplied to an adaptive threshold sub-module 34 which produces a binary image by setting the brightest X pixels in the image data to white and setting all the remaining pixels to black, to produce a series of blobs in the binary image. The resulting image data is supplied to a blob classification sub-module 36 in which all the blobs are compared with a set of criteria to determine whether they are to be considered as valid spots. Diagram 2 in FIG. 8 shows a series of blobs 38 relative to a spot search box 40 on a binary spot display 42. The process locates each of the blobs and defines the box around each blob, the properties and dimensions of each box and the blob within it being used to determine whether the blob is likely to be a valid spot. A series of parameters are assigned to each of the blobs, these parameters defining the size of each blob, the aspect ratio (that is the ratio of the minor axis to the major axis), the fill factor (that is the ratio of blob size to box size) and the location of the blob.

Output data representative of the location and geometry of each blob are passed from the blob classification module 36 to a spot identification module 44 in which the parameters of each blob are compared with a set of criteria as follows:

(i) the location of the blob must be within the spot search area 24;

(ii) the size of the blob must be within maximum and minimum size limits; and (iii) the aspect ratio of the blob must meet this constraint.

(iv) the fill factor of the blob must meet this constraint

A blob is classified as a valid spot by the spot identification module 44 if these criteria are met. If the system is set up to search for more than one spot, a multiple-spot identification module 46 receives an input indicative of the list of valid spots from the spot identification module 44, and performs a search for associated daughter spots considering each spot in turn to be the reference spot. The search for the daughter spots uses a series of multi-spot search areas 40 defined relative to the reference spot as shown in diagram 2 of FIG. 8. If a spot is found to be within the multi-spot search area it is considered to be a daughter spot. If one or more daughter spots is found to be present, this ends the searching sequence. The multiple-spot identification module 46 provides output signals indicative of the location and size of the reference and daughter spots, and these are passed to the pupil location module 14 in FIG. 1. Each valid spot is assessed to determine if it has the appropriate daughter spots. A reference spot found with at least one correct daughter spot is defined as the correct reference spot.

In this way blobs due to valid spots can be distinguished from blobs caused by extraneous sources of light, such as reflections of sunlight from the optics and the eye, reflections from moisture at the eye/eyelid boundary, and reflections from the sclera (the white region of the eye which often is not as smooth as the cornea and can generate many bright patches).

Figure 3:
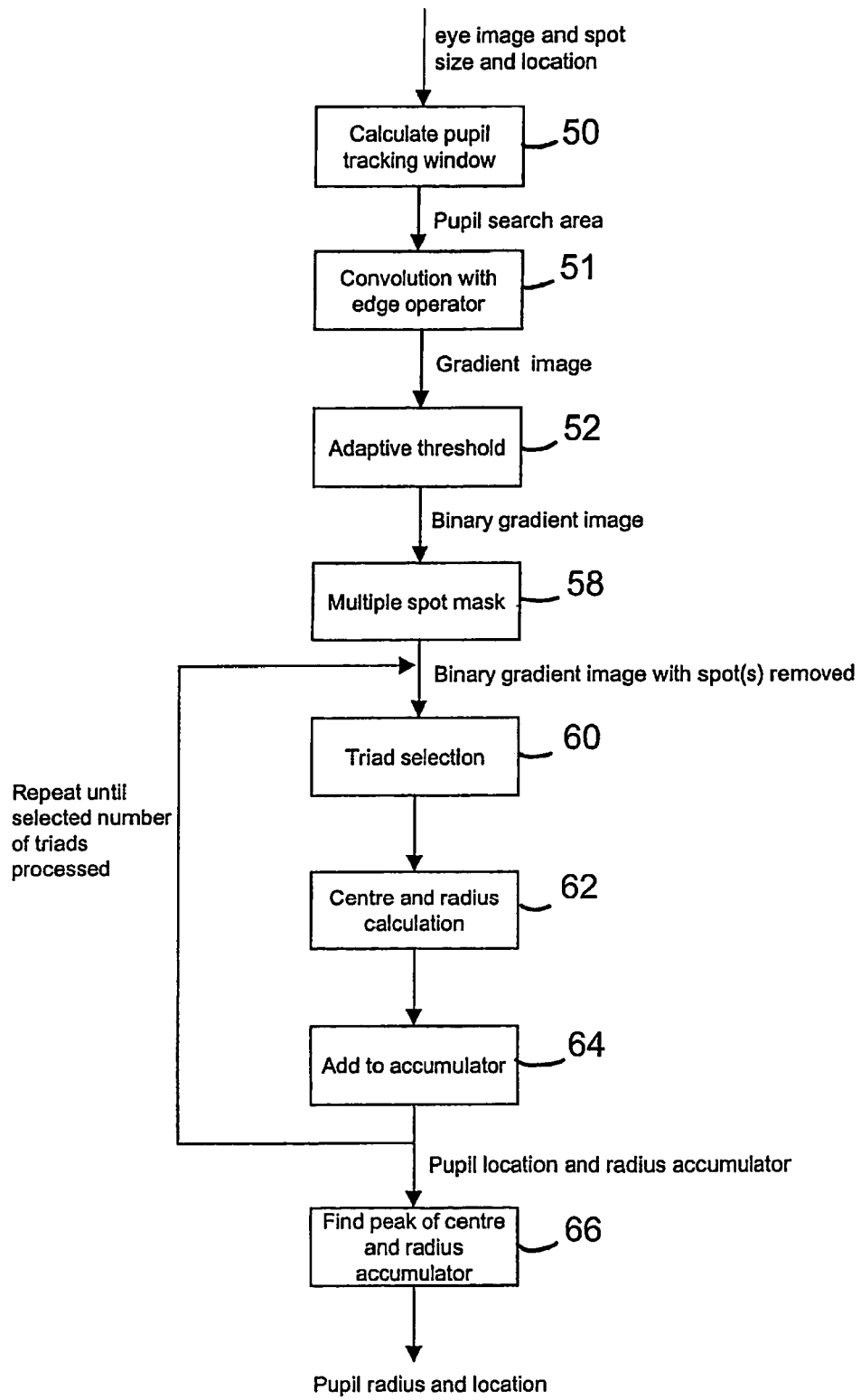

FIG. 3 shows the sub-modules within the pupil location module 14 which receives input signals representative of the image of the eye and the size and location of the reference and daughter spots. In a sub-module 50, the pupil tracking area 26 is calculated by creating a sub-image containing the pupil 22 and a small surrounding border, and the location of the pupil tracking area 26 is defined with reference to the reference spot 30 by horizontal and vertical gains and offsets. An output signal indicative of the pupil tracking area is then supplied to a further sub-module 51 in which convolution of the pupil sub-image with an edge operator is effected to produce a gradient image output signal which is supplied to an adaptive threshold sub-module 52. In the adaptive threshold sub-module 52 the brightest X pixels in the gradient image are set to white and all the remaining pixels in the image are set to black to produce a thresholded gradient image 54 within the pupil tracking area as shown in diagram 3 of FIG. 8. It will be appreciated that convolution is a standard image processing function. In this case convolution highlights the edges (regions of high brightness gradient) of the image. More particularly two images are involved, namely the pupil tracking area and an edge operator. This edge operator is actually two small images, one being designed to highlight horizontal edges while the other highlights vertical edges. The results of these two convolutions are combined to produce the gradient image (an image in which only the edges regions of high gradient of the original pupil tracking area are shown).

The spot size and location information is then used to mask the spots from the thresholded gradient image 54 in a multiple spot mask sub-module 58, as shown at 56 in diagram 3 of FIG. 8, and an output signal indicative of the binary gradient image with spots removed is supplied to a triad selection sub-module 60 in which three of the remaining white pixels in the image are selected at random. The selected pixels are then used to determine the centre of a circle which would pass through all three pixels and to calculate the centre and radius of such a circle in a calculation sub-module 62. In an accumulator sub-module 64 the x and y co-ordinates of the centre and radius of this circle are each added to a separate accumulator. These processes are then repeated until a predefined number of triads have been processed. The peak of each accumulator is then calculated in a further accumulator sub-module 66, and these values are used to determine the x and y co-ordinates of the centre of the pupil and the radius of the pupil.

The information indicative of the location and size of each spot and the radius and location of the pupil is then supplied after decalibration to the scene overlay module 10 to provide an overlay of the point of regard 68 on the scene image 70, as shown in Diagram 4 of FIG. 8. In order to provide output signals indicative of the point of regard and the location of the pupil and spots this data is supplied to the log file module 18. In this overlay process the scene overlay module generates a cursor which is superimposed on the scene image in a position determined by differences in the horizontal and vertical position of the centre of the reference spot and the centre of the pupil within the eye image adjusted by gain and offset factors. These gain and offset factors are determined by a prior calibration process in which the user fixates on specified objects within the scene image so that the direction of regard in the scene image has been related to the differences in the horizontal and vertical position of the centre on the reference spot and the centre of the pupil within the eye image.

Figure 4A:
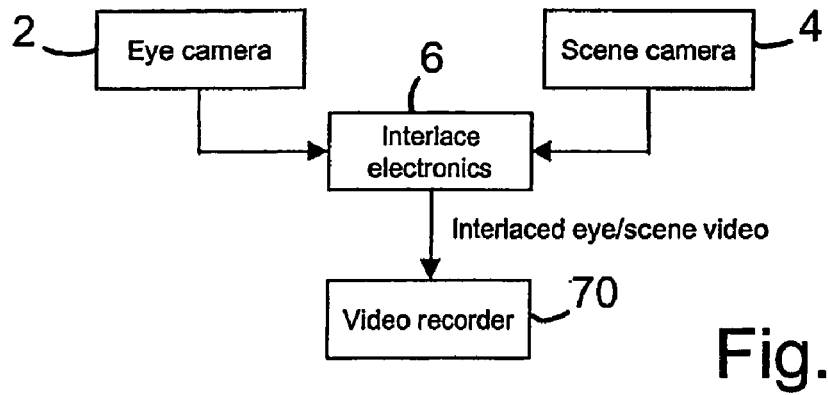
FIGS. 4a and 4b are block diagrams illustrating the implementation of the eye tracking system of FIG. 1 in an arrangement in which the tracked images are processed in a further operation carried out some time after the actual tracking of the images.
Figure 4B:
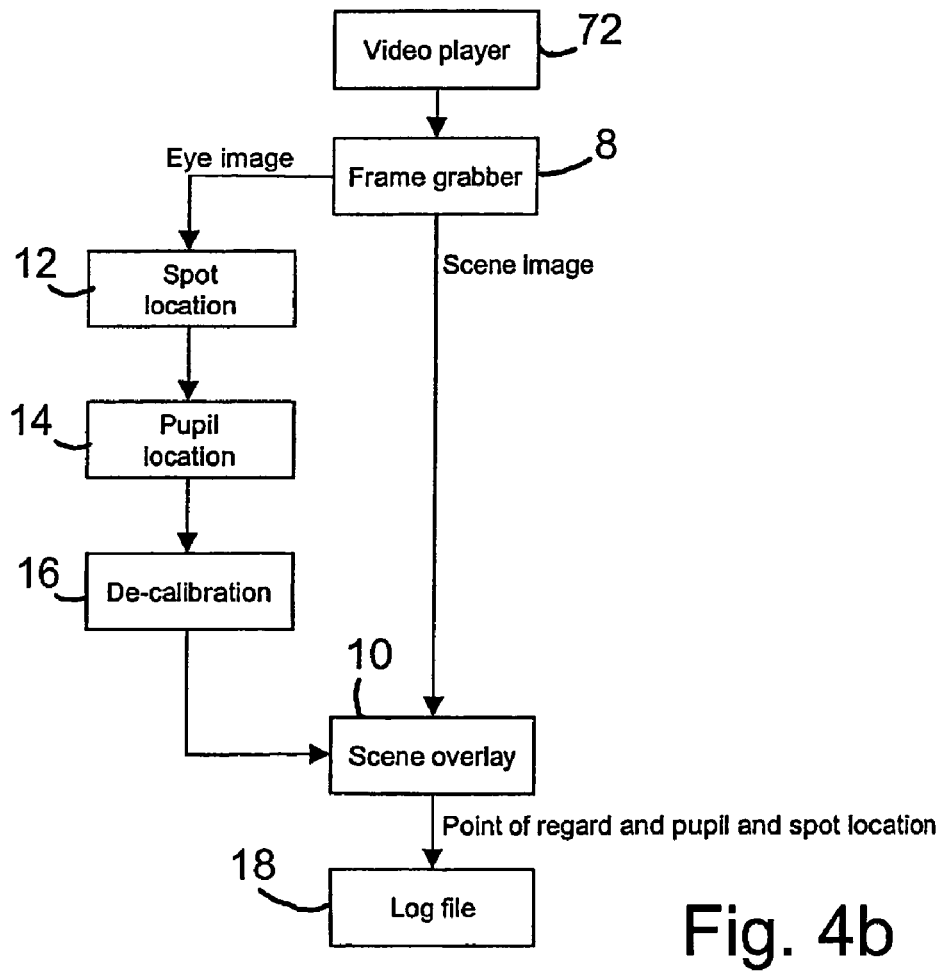

Whilst the above description is given with reference to an eye tracking system in which the interleaved eye and scene images obtained from the cameras 2 and 4 are processed during live operation, that is at the same time as the images are captured by the cameras, it will be appreciated that such a tracking system in accordance with the invention could also be implemented utilising post processing, as shown diagrammatically in FIGS. 4*a* and 4*b*. As shown in FIG. 4*a* the interleaved eye/scene video signals outputted by the interface electronics module 6 are recorded by a video recorder 70 on video tape for later analysis. Subsequently the recorded eye/scene video signals may be replayed by a video player 72 which supplies its output signals to the frame grabber module 8 of the processing system, as shown in FIG. 4*b*.

Figure 5:
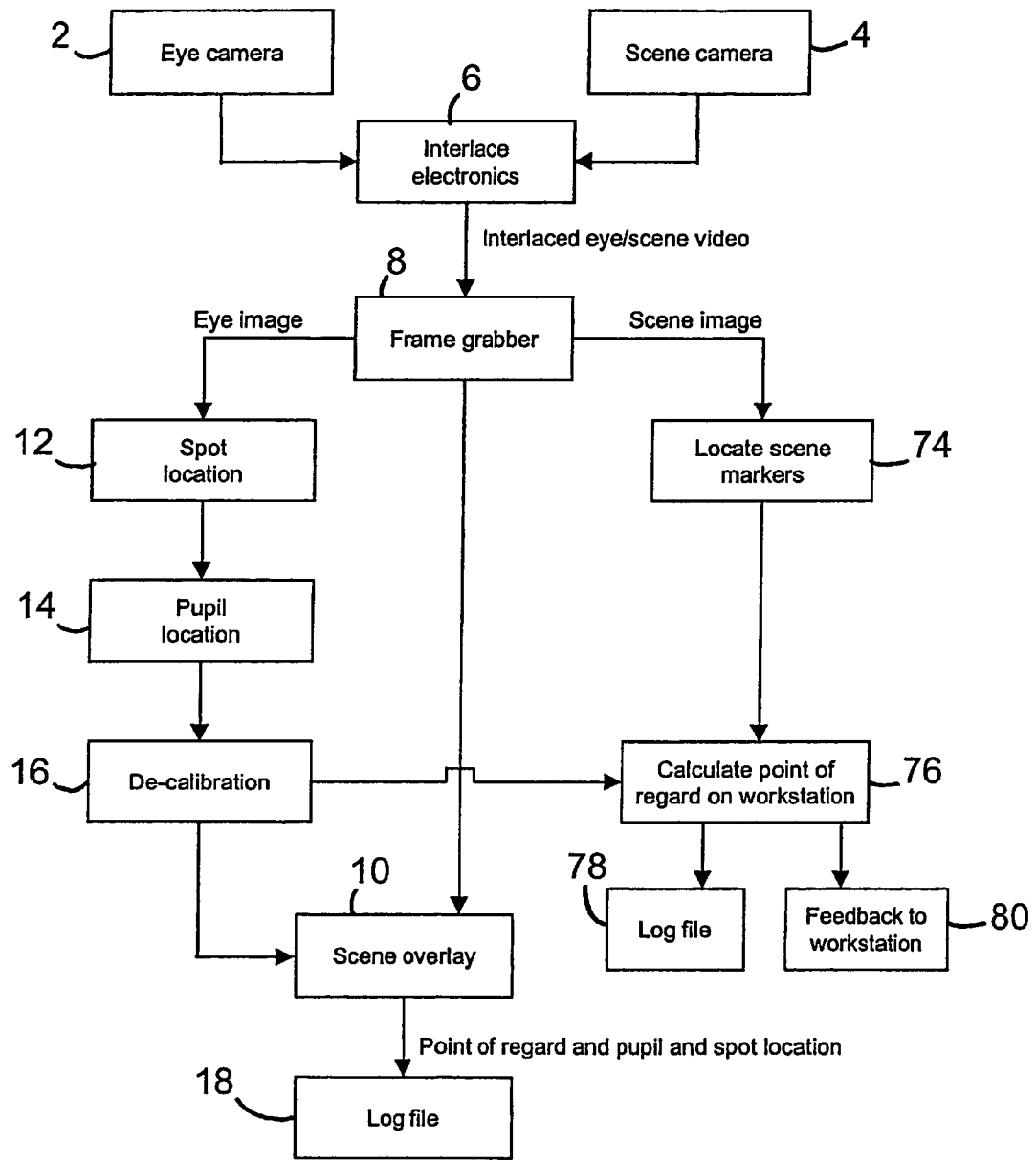
FIG. 5 is a block diagram illustrating use of the eye tracking of FIG. 1 as a workstation interface tool.

FIG. 5 shows an eye tracking system in accordance with the invention for use as a workstation interface tool. In this embodiment output signals representative of the scene image are supplied by the frame grabber module 8 to a module 74 for locating the positions of scene markers, e.g. infrared light-emitting diodes in the image. The positions of the scene markers are then used in the decalibration process to calculate the point of regard on the workstation monitor 76. Output signals from the workstation may be supplied to a log file 78 storing such points of regard, and to provide feedback 80 to the workstation. In this process the scene image is analysed to find the marker spots and calculate the scene camera position and orientation by solving a set of transformation equations that use coefficients that depend upon the scene camera field of view and the marker geometry. The coefficients are determined by a prior calibration with the scene camera held in known positions and orientations and the spot locations determined within the scene camera image. The point of regard of the eye on the workstation monitor is determined by combining the data for the eye direction relative to the scene camera with the data for the scene camera relative to the workstation. This information provides the feedback 80 to the workstation, so that the workstation knows where on the monitor the subject is looking, which will enable, for example, eye control of a mouse pointer and/or icon selection etc.

Figure 6:
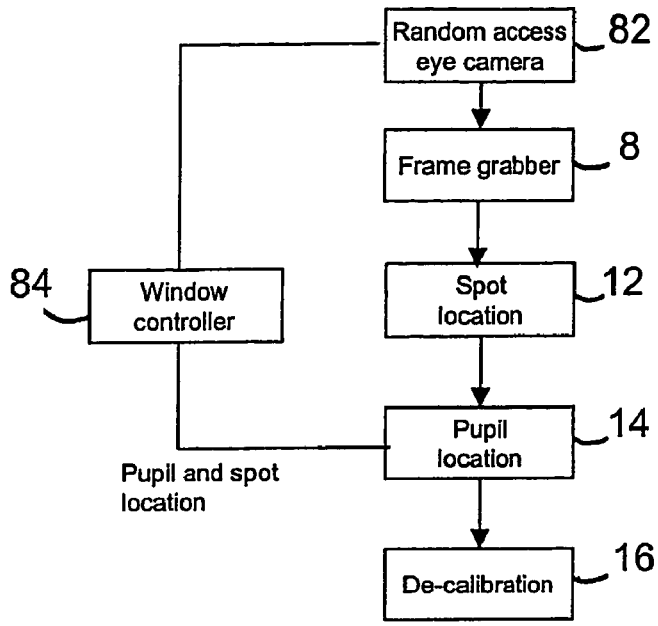
FIG. 6 is a block diagram showing a modification of the eye tracking of FIG. 1 using random access image processing.

FIG. 6 shows a variation of the eye tracking system in accordance with the invention as described above in which a random access eye camera 82 is used to supply signals representative of an image of the eye to the frame grabber module 8, and a window controller module 84 is used to control the camera 82 in dependence on signals indicative of the pupil and spot location provided by the spot and pupil location modules 12 and 14. This control method, which will include dynamic windowing using a CMOS random access sensor, improves the accuracy, reliability and update rate of the system. The use of a CMOS random access sensor is advantageous in that it allows selected pixels to be read out by the sensor rather than requiring the entire image to be readout each frame. Thus, in the event of there being only a small region of interest in the image, it is possible to readout only this area and this would significantly reduce the number pixels to be processed and remove artefacts from other areas of the image. Such a sensor also has a very high dynamic range, and minimises flaring and saturation effects caused by bright sunlight, which is particularly important for robust eye tracking outdoors.

Figure 7:
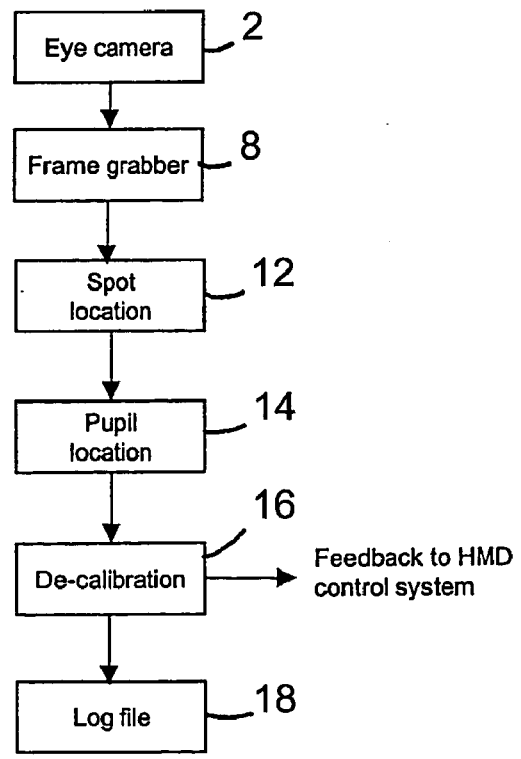
FIG. 7 is a block diagram illustrating use of the eye tracking of FIG. 1 with a helmet mounted display (HMD)

FIG. 7 shows a further variant of the eye tracking system already described in which the system is integrated with a head-mounted display, such as a helmet-mounted display (HMD). The output signals from the decalibration module 16 are fed back to the display control system so that a cursor indicating the measured eye direction is displayed to the user and the eye direction data are combined with measurements from an independent helmet tracking system. Such data are used as input to effect control over other sub-systems connected to the display, for instance the pointing direction of a missile seeker head in a combat aircraft.

In the case of a HMD the eye camera is generally helmet mounted, a proportion of the associated electronics being helmet mounted and the remainder of the electronics being aircraft mounted. Such a system may not require a scene camera, although, if a scene camera is used, it would be helmet mounted. In such a system it is possible to dispense with a scene camera, and instead the eye camera may be calibrated with respect to the HMD on the basis of a knowledge of the head position and orientation and the aircraft position to enable target designation. This enables the user to see an indication in the HMD of where the system believes the user is looking and/or to highlight a target which has been designated by the user's eye. Where the indication is to be given with respect to the scene itself, rather than simply with respect to the user's head, it will be appreciated that a system must be provided for tracking movements of the user's head The above described eye tracking systems in accordance with the invention provide a number of unique benefits. In particular the algorithm is particularly effective at finding image features under adverse lighting conditions. Furthermore the system enables fast and simple setup and calibration, and has a frame rate of approximately 60 Hz. It is also adaptable to virtually any video-based eye tracker arrangement.

It is contemplated that such an eye tracking system will be applicable in a large range of applications, including military target designation, military and civilian training, symbology design, and in the human/computer interface, e.g. for selecting items on screen by point of regard. Other possible applications are in advertising (to determine whether an advertisement catches an observer's eye), monitoring of the user's state (to determine stress level dependent on pupil size and type of eye movements) and to assist communication by handicapped people.

The invention claimed is:

1. An eye tracking system for monitoring the movement of a user's eye, the system comprising:
   (a) video data input means for receiving video data produced by eye imaging means monitoring the user's eye;
   (b) spot location means for determining from the video data the location of a reference spot formed on the user's eye by illumination of the user's eye by a point source of light, the spot location means including adaptive threshold means for providing an indication of parts of the image produced by the eye imaging means which have a brightness greater than a threshold value, and spot identification means for selecting a valid reference spot by comparing said parts of the image with predetermined validity criteria;
   (c) pupil location means for determining from the video data the location of the centre of the pupil of the user's eye relative to the reference spot in order to determine the user's line of gaze, the pupil location means including:
      selection means for selecting a pupil tracking window comprising a portion of the image produced by the eye imaging means containing the pupil relative to the valid reference spot location,
      edge determination means for determining an edge of the pupil by selection of those parts of said image portion having a gradient greater than a threshold value,
      centre determination means for location of the centre of the pupil by making reference to selected points about the edge of the pupil, wherein the centre determination means includes
         triad selection means for selecting substantially randomly three super-threshold pixels to form a triad for further processing, from among a plurality of pixels of pupil image data, and
         triad processing means for determining the centre and radius of a hypothetical circle passing through each of the selected pixels; and
   (d) display means for indicating the user's point of regard from the user's line of gaze determined by the pupil and spot location means.

2. A tracking system according to claim 1, wherein the video data input means is adapted to additionally receive video data produced by scene imaging means monitoring a scene being observed by the user's eye, and the display means is adapted to indicate the user's point of regard relative to an image of the scene obtained from the video data.

3. A tracking system according to claim 1, wherein the adaptive threshold means is adapted to set a plurality of pixels of eye image data such that the pixels having a brightness greater than the threshold value are set to a predetermined high level and the pixels having a brightness not greater than the threshold value are set to a predetermined low level.

4. A tracking system according to claim 1, wherein the spot location means includes blob classification means for determining the location and geometry of the parts of the image indicated by the adaptive threshold means.

5. A tracking system according to claim 4, wherein the spot identification means is adapted to select valid spots by comparing the output of the blob classification means with predetermined validity criteria.

6. A tracking system according to claim 1, wherein the spot location means includes multiple spot identification means for identifying a reference spot by searching for the existence of further valid spots in search areas at defined locations relative to each reference spot indicated by the spot identification means.

7. A tracking system according to claim 1, wherein the edge determination means provides a gradient image of the edge of the pupil by convolving said image portion in the pupil tracking window with an edge operator.

8. A tracking system according to claim 1, wherein the adaptive threshold means is adapted to provide an indication of those parts of a sub-image of the pupil produced by the eye imaging means which have a brightness greater than a threshold value.

9. A tracking system according to claim 1, wherein the pupil location means includes difference means for providing an output from which the influence of the reference spot and any related spots has been removed prior to selection of those parts of the gradient of said image portion in the pupil tracking window which have a gradient greater than the threshold value.

10. A tracking system according to claim 1, wherein the centre determination means further includes accumulating means for accumulating a plurality of sets of values of the centre and radius determined by the triad processing means for a plurality of triads successively selected by the triad selection means.

11. A tracking system according to claim 10, wherein the centre determination means further includes peak determination means for determining, from the sets of values accumulated by the accumulating means, the values of the centre and radius of the pupil.

12. A tracking system according to claim 1, further comprising log file means for maintaining a log file of successive values of the user's point of regard in the scene.

13. A tracking system according to claim 1, further including eye imaging means for monitoring the user's eye.

14. A tracking system according to claim 1, further including scene imaging means for monitoring the scene being observed by the user's eye.

15. A tracking system according to claim 1, further including video data recording means for recording video data produced by the eye imaging means and scene imaging means.

16. A tracking system according to claim 1, further including video data playback means for reproducing video data produced by the eye imaging means and scene imaging means.

17. An eye tracking system according to claim 1 comprising:
   scene imaging means arranged to monitor a scene being observed by the user's eye; and
   scene overlay means for indicating the user's point of regard in the scene from the user's line of gaze determined by the pupil and spot location means relative to an image of the scene obtained from the video data.

* * * * *